(12) United States Patent
de Perthuis et al.

(10) Patent No.: US 10,903,868 B2
(45) Date of Patent: Jan. 26, 2021

(54) RF SYSTEM AND METHOD FOR IMPLEMENTING ROLE SWITCHING OF TRANSCEIVER NODES

(71) Applicant: NXP B.V., Eindhoven (NL)

(72) Inventors: Hugues Jean Marie de Perthuis, Garcelles (FR); Frank Leong, Veldhoven (NL); Sören Heisrath, Kaltenkirchen (DE); Diwakar Subraveti, Bangalore (IN); Srivathsa Masthi Parthasarathi, Bangalore (IN)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/718,061

(22) Filed: Dec. 17, 2019

(65) Prior Publication Data

US 2020/0204203 A1  Jun. 25, 2020

(30) Foreign Application Priority Data

Dec. 21, 2018  (EP) .................................... 18290147

(51) Int. Cl.
*H04B 1/3822* (2015.01)
*H04W 4/02* (2018.01)
(Continued)

(52) U.S. Cl.
CPC .......... *H04B 1/3822* (2013.01); *H04W 4/023* (2013.01); *H04W 4/021* (2013.01); *H04W 4/025* (2013.01)

(58) Field of Classification Search
CPC .... H04B 1/3822; H04W 4/023; H04W 4/021; H04W 4/025; H04W 4/80; H04W 12/02;
(Continued)

(56) References Cited

U.S. PATENT DOCUMENTS

| 9,405,944 B2 | 8/2016 | Van Wiemeersch et al. |
| 9,894,613 B2 | 2/2018 | Scheim et al. |

(Continued)

*Primary Examiner* — Inder P Mehra
(74) *Attorney, Agent, or Firm* — Rajeev Madnawat

(57) ABSTRACT

Disclosed is a RF system (100) having at least one transceiver node device (110, 112, 114, 116, 118, 120) that is capable to assume, at a controllable point in time and/or for a controllable time period, each one of the following roles (210, 220, 230, 240): a first role (210) comprising listening or answering to a message from an active communication session, in particular ranging sessions, a second role (220) comprising listening for new communication sessions, in particular ranging sessions, a third role (230) comprising staying idle, and optionally a third role (230) comprising scanning for ongoing communication sessions, in particular ranging sessions, of other RF systems. The RF system (100) further comprises a controller device (134) communicatively interlinked with the at least one, in particular each, transceiver node device (110, 112, 114, 116, 118, 120) and capable to control an assignment of roles to the at least one, in particular each, transceiver node device, in particular to control for a transceiver node device a point in time to assume a role and/or a duration of performing a role and/or a duty cycle of performing a role (210, 220, 230, 240).

19 Claims, 3 Drawing Sheets

(51) Int. Cl.
*H04W 4/021* (2018.01)
*G01S 13/74* (2006.01)
*G07C 9/00* (2020.01)

(58) Field of Classification Search
CPC . H04W 48/14; H04W 48/16; H04W 74/0808; H04W 76/14; H04L 31/3822; G01S 13/74; G01S 5/02; G01S 5/0215; G07C 2009/00373; G07C 2009/00793; G07C 9/00309; G07C 2009/00357; G07C 2009/00642; B60R 25/24
USPC .................................................... 455/456.1
See application file for complete search history.

(56) References Cited

U.S. PATENT DOCUMENTS

| | | | |
|---|---|---|---|
| 2002/0030591 A1* | 3/2002 | Paranjpe | B60Q 9/006 340/436 |
| 2007/0124039 A1* | 5/2007 | Sakurai | G07C 5/008 701/29.1 |
| 2009/0115609 A1* | 5/2009 | Weaver | G06Q 10/08 340/572.1 |
| 2011/0035052 A1* | 2/2011 | McLurkin | G05D 1/0297 700/248 |
| 2011/0084816 A1* | 4/2011 | Briese | H04W 52/0229 340/10.34 |
| 2011/0263214 A1 | 10/2011 | Robinson et al. | |
| 2014/0285319 A1 | 9/2014 | Khan et al. | |
| 2017/0206780 A1* | 7/2017 | Pilat | G08C 17/02 |
| 2019/0013937 A1 | 1/2019 | Leong et al. | |
| 2019/0023224 A1 | 1/2019 | Sammer et al. | |
| 2020/0219344 A1* | 7/2020 | Stitt | G07C 9/00309 |
| 2020/0226865 A1 | 7/2020 | de Perthuis et al. | |

\* cited by examiner

RF SYSTEM AND METHOD FOR IMPLEMENTING ROLE SWITCHING OF TRANSCEIVER NODES

CROSS-REFERENCE TO RELATED APPLICATIONS

This application claims the priority under 35 U.S.C. § 119 of European patent application no. 18290147.0, filed on Dec. 21, 2018, the contents of which are incorporated by reference herein.

TECHNICAL AREA

The invention relates to a RF system, such as a RF ranging system, and a method for operating a RF system, which implement a switching of roles of transceiver nodes of the system.

BACKGROUND TO THE INVENTION

Modern comfort cars, which are currently on the market, may be equipped with a passive keyless entry (PKE) system. In such a PKE system, approaching a car with an associated tag (or key fob) is enough to unlock the car, as an example of a base structure to be opened and closed, without the need to press a button that may be provided on the tag/key fob.

Present keyless entry systems on the market rely on measurements of a Received Signal Strength Indicator (RSSI) to estimate a range of the key fob from the car. An attacker can use amplifiers to relay a key fob signal so that the key fob appears close to the car.

Secure RF ranging systems can also be used for other applications, such a building or transit access system.

An RF ranging system employs the Time-of-Flight principle to determine the distance between two objects or markers on objects. Usually, a transceiver's transmitter sends out a waveform (commonly a chirp or a pulse), which is either reflected by an object or retransmitted by a second transceiver. Based on the amount of time it takes for the reflection or retransmission to reach the originating transceiver's receiver, the distance between the objects can be calculated. The so determined distance between the receiver and the transmitter will be used as a decision criterion to enable access.

Accurate ranging for keyless entry systems can also be used to add new features, such as opening only the door next to the key fob, or adapting the settings of the car to each of plural users, for instance the driver's and the passenger's seat as well as mirrors positioning, air conditioning, etc.

To enable such new features, it is required that a car can determine the position of multiple key fobs and devices at a same time (assuming both driver and passengers have a key fob or other devices paired with the car).

To allow such new use features, a car ranging system must be capable to satisfy the requirements of simultaneously:
 executing simultaneous ranging sessions with multiple key fob or devices,
 listening for potential new ranging sessions, and
 determining, which RF parameters would result in a best Quality of Service (QoS) for new ranging sessions.

These requirements can also be assigned, more generally, to a RF system having a plurality of node devices and installed in a base structure (i.e. a car, a building, a transit system control barrier), wherein the node devices interact with one or more external devices, e.g. portable tags or key fobs or other portable devices, which are used to control access to and/or operations of the base structure.

SUMMARY OF THE INVENTION

It is an object of the present invention to provide a RF system having a plurality of node devices and being installed in a base structure, wherein the node devices interact with one or more external devices, which are used to control access to and/or operations of the base structure, wherein the RF system is capable to satisfy the aforementioned requirements.

This object is solved by the subjects having the features according to the independent patent claims. Further embodiment examples of the invention are described in the dependent claims.

According to a first exemplary embodiment example of the present invention, there is provided a RF system, in particular a RF ranging system, for example for controlling secure keyless car access, wherein the RF system has at least one transceiver node device, which is capable to assume, at a controllable point in time and/or for a controllable time period, each one of the following roles:
 a first role comprising listening or answering to a message from an active communication session, in particular ranging sessions,
 a second role comprising listening for new communication sessions, in particular ranging sessions, and
 a third role comprising staying idle.

In an embodiment of this RF system, the at least one transceiver node device may be capable, at a controllable point in time, to switch from the third role to the first role and from the first role to the third role, and to switch from the third role to the second role and from the second role to the third role.

In an embodiment of this RF system, the at least one transceiver node device may be capable to further assume, at a controllable point in time and/or for a controllable time period, a fourth role comprising scanning for ongoing communication sessions, in particular ranging sessions, of other RF systems, and the at least one transceiver node device may be capable, at a controllable point in time, to switch from the third role to the fourth role and from the fourth role to the third role.

In an embodiment of this RF system, the RF system may further have a controller device and a plurality of transceiver node devices, for example at least four node devices, in particular five node devices, wherein each transceiver node device may be capable to assume each one of the first, second, third and fourth roles for a controllable time period under control of the controller device.

In a car having a keyless entry system with RF ranging, multiple transceiver node device (transceivers) might be present on the car, e.g., typically at least one node device at each corner and one node device at the top of the car.

In an embodiment of this RF system, the RF system may further have a controller device communicatively interlinked with the at least one, in particular with each, transceiver node device and capable to control an assignment of roles to the at least one, in particular each, transceiver node device, in particular to control for a transceiver node device a point in time to assume a role and/or a duration of performing a role and/or a duty cycle of performing a role.

In an embodiment of this RF system, at least a portion of the control of the assignment of roles to the transceiver node devices may not be implemented in a, for example central, controller device. Rather, at least a portion of the control of the assignment of roles to the transceiver node devices may be implemented at the level of the transceiver node devices, or concentrated in a selected one of the transceiver node devices. A switch to new role assignment may be something, which is decided either at node device level or at controller device level.

In an embodiment of this RF system, for controlling a point in time of transitioning to and/or from, and/or a duration of performing, and/or a duty cycle of performing, the first role, the following information may be taken into account, in particular by a controller device of the RF system:
  a quality of a received signal, in particular for assigning a specific communication session to only a part of the transceiver node devices,
  a relationship between qualities of signals as received by at least two transceiver node devices,
  qualities of interfering signals as received by at least two transceiver node devices,
  information relating to collisions between own messages of the RF system and interfering messages from other RF systems,
  a distance to a RF transceiver device operating at the other end of an active RF communication session, in particular for decreasing a duration and/or a duty cycle of the first role of a transceiver node device located at a large distance, in particular located further away than a predetermined distance.

In an embodiment of this RF system, for controlling a point in time of transitioning to and/or from, and/or a duration of performing, and/or a duty cycle of performing, the second role, the following information may be taken into account, in particular by a controller device of the RF system:
  One or more synchronization patterns of RF communication sessions, which are ongoing in an environment and which have been detected in particular by a transceiver node device during performing the fourth role, in particular for determining RF parameters to be used in a new communication session expected to start.
  One or more previous radio packet collision events, i.e. detecting failures to transmit/receive data packets without actively scanning a band outside of a normal transmit/receive operation.

In an embodiment of this RF system, for controlling a point in time of transitioning to and/or from, and/or a duration of performing, and/or a duty cycle of performing, the third role, the following information may be taken into account, in particular by a controller device of the RF system:
  a state of a battery used to supply power to the RF system, in particular a battery of an apparatus, for example a car, having the RF system, for example to increase or decrease a duration and/or a duty cycle of the third role as a function of a charging state of the battery,
  a time of the day, for example to increase or decrease a duration and/or a duty cycle of the third role as a function of a predetermined average amount of social activity and/or RF activity at a time of the day, in particular to increase a duration and/or a duty cycle of the third role at night time,
  a relationship between amounts of RF activity as received by at least two transceiver node devices, for example to increase or decrease a duration and/or a duty cycle of the third role for a part of the at least two transceiver node devices. For example, if the at least two node devices have a same, or almost same, or similar RF view, then a part of them may be controlled to have their duration and/or duty time of the third role increased.

In an embodiment of this RF system, for controlling a point in time of transitioning to and/or from, and/or a duration of performing, and/or a duty cycle of performing, the fourth role, the following information may be taken into account, in particular by a controller device of the RF system:
  an amount of RF activity present and/or detected by the RF system in an environment of the RF system, in particular for decreasing a duration and/or a duty cycle for a transceiver node device to perform the fourth role, if a low or absent amount of RF activity is present and/or detected, or for increasing a duration and/or a duty cycle for a transceiver node device to perform the fourth role, if a large amount of RF activity is present and/or detected.

In an embodiment of this RF system, triggering events for controlling a transceiver node device to assume the first role may comprise any one of the following:
  detection of a signal, which is outside of RF bands that are occupied by RF ranging sessions, in particular a Bluetooth low energy (BLE) signal or a WiFi signal, transmitted from a device belonging to the RF system and querying to initiate a new communication session, in particular a ranging session,
  detection of a low frequency signal sent from an apparatus, for example from a car, having the RF system,
  detection of a geofencing barrier,
  detection of a motion of an object in an environment of the RF system.

In an embodiment of this RF system, a transceiver node device being capable to perform the first role may comprise the transceiver node device being capable:
  to transmit a query for a response from another device belonging to the RF system,
  to wait for a response,
  if a response comprising a message is received, to handle the message and/or taking action according to a contents of the message, and
  if no response is received until an occurrence of a timeout, to increment an error counter.

In an embodiment of this RF system, the transceiver node device being capable to perform the first role may further comprise the transceiver node device being capable:
  further to having incremented the error counter, to check if a predetermined error count maximum is exceeded,
  if the error count maximum is exceeded, to transition to the third role, and
  if the error count maximum is not exceeded, to transmit a further query for a response from another device belonging to the RF system.

In an embodiment of this RF system, the controller device may be capable to switch an assignment of roles to the at least one transceiver node device, in particular to each transceiver node device belonging to the RF system, regularly, in particular periodically or according to a predetermined time schedule.

In an embodiment of this RF system, the controller device may be capable to perform at least one of the following:
  synchronizing assignments of roles among at least two, in particular among all, transceiver node devices,
  defining for at least one, in particular for each, transceiver node device a pattern for the durations and/or duty cycles of the roles that the node device should perform, for example defining a pattern of duty cycles comprising 1%±0.5% performing the first role, 24%±12% performing the second role, 50%±25% performing the third role, and 25%±13% performing the fourth role, wherein "%" refers to a time proportion of a duty cycle in relation to total operation time, setting up a configuration of RF parameters for at least one, in particular each, transceiver node device for each role of the node device, receiving results of performing scanning for ongoing communication sessions from any transceiver node device performing the fourth role, receiving ranging measurement data, in particular timestamps, when listening to messages during a ranging session of any transceiver node device performing the first role.

In an embodiment of the RF system, the RF system may operate as an ultra-wide band RF system, in particular as an ultra-wide band based keyless entry system.

According to a second exemplary embodiment example of the present invention, there is provided a method for operating a RF system, in particular a RF ranging system, for example for controlling secure keyless car access, wherein the RF system has a plurality of transceiver node devices and a controller device communicatively interlinked with each one of the transceiver node devices. The method comprises one or more of the following sequences 1) to 5) of steps of operation.

According to Sequence 1), the method comprises; assuming, by at least one of the transceiver node devices, for respective time periods controlled by the controller device, each one of the following roles:

a first role comprising listening or answering to a message from an active communication session, in particular ranging sessions, a second role comprising listening for new communication sessions, in particular ranging sessions, a third rote comprising staying idle, and optionally, a fourth role comprising scanning for ongoing communication sessions, in particular ranging sessions, of other RF systems.

According to Sequence 2), the method comprises: at least one transceiver node device, under control of the controller device:

switching from the third role to the first role and from the first role to the third role, switching from the third role to the second role and from the second role to the third role, and switching from the third role to the fourth role and from the fourth role to the third role.

According to Sequence 3), the method comprises Subsequences 3.1), 3.2), 3.3), and 3.4).

According to Subsequence 3.1), for controlling, in a transceiver node device, a point in time of transitioning to and/or from, and/or a duration of performing, and/or a duty cycle of performing, the first role, the controller device takes into account at least one of the following information:

a quality of a received signal, in particular for assigning a specific communication session to only a part of the transceiver node devices, a relationship between qualities of signals as received by at least two transceiver node devices, a distance to a RF transceiver device operating at the other end of an active RF communication session, in particular for decreasing a duration and/or a duty cycle of the first role of a transceiver node device located at a large distance, in particular located further away than a predetermined distance.

According to Subsequence 3.2), for controlling, in a transceiver node device, a point in time of transitioning to and/or from, and/or a duration of performing, and/or a duty cycle of performing, the second role, the controller device takes into account at least one of the following information:

one or more synchronization patterns of RF communication sessions, which are ongoing in an environment and which have been detected in particular by a transceiver node device during performing the fourth role, in particular for determining RF parameters to be used in a new communication session expected to start.

According to Subsequence 3.3), for controlling, in a transceiver node device, a point in time of transitioning to and/or from, and/or a duration of performing, and/or a duty cycle of performing, the third role, the controller device takes into account at least one of the following information:

a state of a battery used to supply power to the RF system, in particular a battery of an apparatus, for example a car, having the RF system, for example to increase or decrease a duration and/or a duty cycle of the third role as a function of a charging state of the battery, a time of the day, for example to increase or decrease a duration and/or a duty cycle of the third role as a function of a predetermined average amount of social activity and/or RF activity at a time of the day, in particular to increase a duration and/or a duty cycle of the third role at night time, a relationship between amounts of RF activity as received by at least two transceiver node devices, for example to increase a duration and/or a duty cycle of the third role for a part of the at least two transceiver node devices.

According to Subsequence 3.4), for controlling, in a transceiver node device, a point in time of transitioning to and/or from, and/or a duration of performing, and/or a duty cycle of performing, the fourth role, the controller device takes into account at least one of the following information:

an amount of RF activity present and/or detected by the RF system in an environment of the RF system, in particular for decreasing a duration and/or a duty cycle for a transceiver node device to perform the fourth role, if a low or absent amount of RF activity is present and/or detected, or for increasing a duration and/or a duty cycle for a transceiver node device to perform the fourth role, if a large amount of RF activity is present and/or detected.

According to Sequence 4), the method comprises: the controller device switching an assignment of roles to the at least one transceiver node device, in particular to each transceiver node device belonging to the RF system, regularly, in particular periodically or according to a predetermined time schedule.

According to Sequence 5), the method comprises Subsequences 5.1), 5.2), 5.3), 5.4) and 5.5) describing control operations of the controller device.

According to Subsequence 5.1), the controller device performs synchronizing assignments of roles among at least two, in particular among all, transceiver node devices.

According to Subsequence 5.2), the controller device performs defining for at least one, in particular for each, transceiver node device a pattern for the durations and/or duty cycles of the roles that the node device should perform, for example defining a pattern of duty cycles comprising 1%±0.5% performing the first role, 24%±12% performing the second role, 50%±25% performing the third role, and 25%±13% performing the fourth role, wherein "%" refers to a time proportion of a duty cycle in relation to total operation time.

According to Subsequence 5.3), the controller device performs setting up a configuration of RF parameters for at least one, in particular each, transceiver node device for each role of the node device.

According to Subsequence 5.4), the controller device performs receiving results of performing scanning for ongoing communication sessions from any transceiver node device performing the fourth role.

According to Subsequence 5.5), the controller device performs receiving ranging measurement data, in particular timestamps, when listening to messages during a ranging session of any transceiver node device performing the first role.

According to a third exemplary embodiment example of the present invention, there is provided a software program, or a machine-readable storage medium storing a software program, for controlling or executing the method according to the second exemplary embodiment example of the present invention, when run on a data processing system, such as a processor, a micro-processor, a control device, an electronic control unit (ECU), a body control unit (BCU), or a computer.

BRIEF DESCRIPTION OF THE DRAWINGS

In the following, exemplary embodiment examples of the present invention are described in detail with reference to the following drawings.

Similar or like components in different figures are provided with the same reference numerals.

DETAILED DESCRIPTION OF PREFERRED EMBODIMENTS

Figure 1:
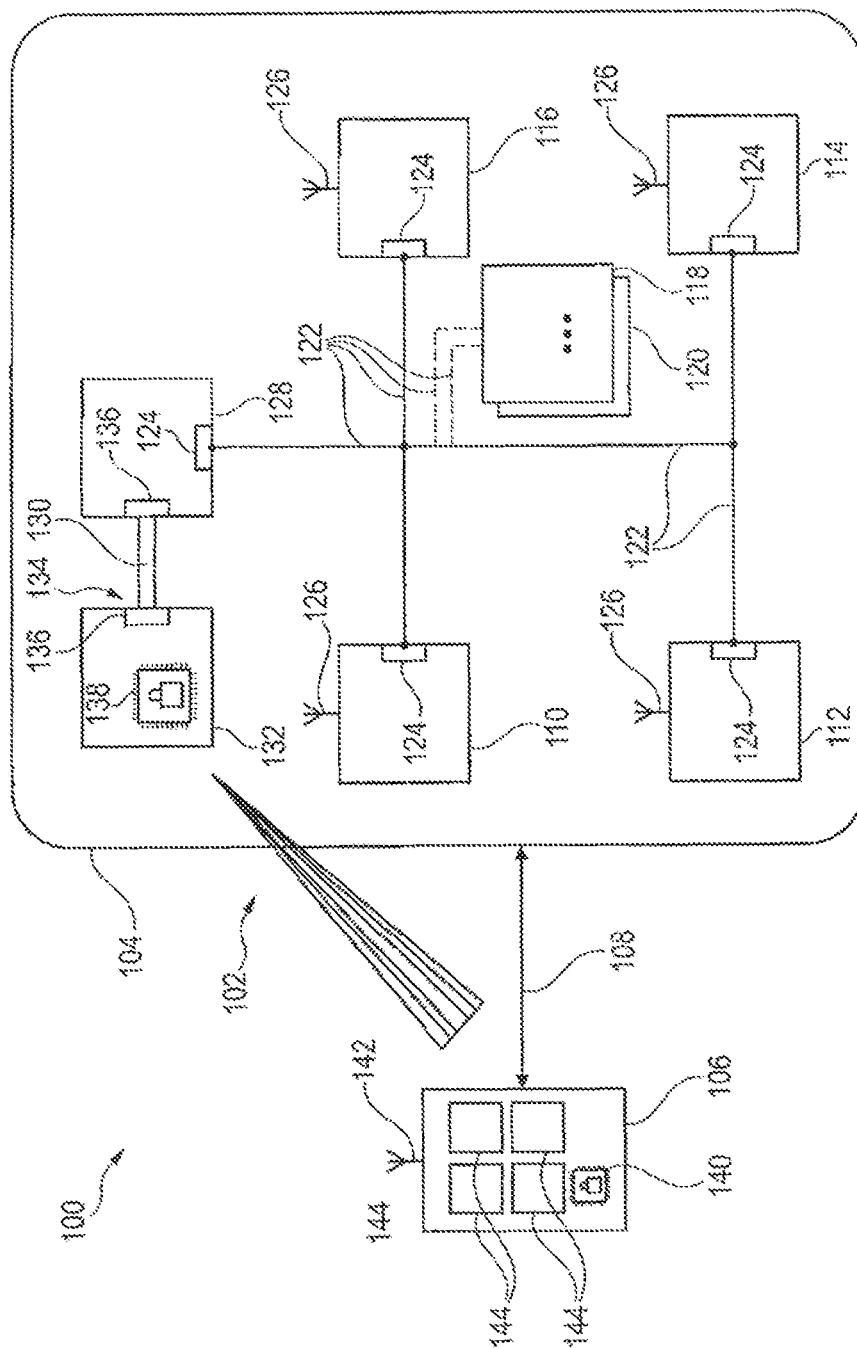
FIG. 1 illustrates a RF system comprising a plurality of transceiver node devices, a controller device, and a portable RF transceiver device (i.e. key fob), according to an embodiment example of the invention.

Before exemplary embodiment examples of the invention are described with reference to the figures, some general aspects of the invention as proposed by the present inventors shall still be explained.

Aspects of the present invention have been developed for the use case of the RF system being a, for example ultra-wide band based, RF ranging system being part of a secure keyless entry system for a car.

In this use case, ultra-wide band RF ranging allows to accurately determine the distance (or range) between the key fob and the car. Such accurate ranging for keyless car entry systems can also be used to add new features, such as opening only the door next to the key fob, or adapting the settings of the car to each of plural users, for instance the driver's and the passenger's seat as well as mirrors positioning, air conditioning, etc.

To enable such new features, it is required that a car can determine the position of multiple key fobs and devices at a same time, whereby it is assumed that both driver and passengers have a key fob or other devices paired with the car. To allow such new features, a car ranging system must be capable to satisfy the following requirements simultaneously:

executing simultaneous ranging sessions with multiples key fob or devices,
listening for potential new ranging sessions, and
determining, which RF parameters would result in a best Quality of Service (QoS) for new ranging sessions.

For car keyless entry system with RF ranging, multiple transceiver node devices (transceivers) will be present on the car, e.g., typically at least one at each corner and one at the top of the car.

To enable such new features, according to an aspect of the present invention, it is proposed to assign different roles to each transceiver node device. The assignment of the roles may be switched under control of a control instance, for example implemented in a special control device. Each node will rotate between the following different roles:

Role 1: Listen or answer to message from active ranging sessions:
In an active session, the timing of the transmission/reception is well known, because a regular scheduling of transmission and reception is used. Typically, this scheduling will comprise several slots of approximately 1 ms during ranging update cycles having durations of approximately 100 ms. Herein, the expression ranging update cycle is understood to include one round of ranging measurements, e.g. one key fob ranging to each transceiver node device on the car.
Separate ranging sessions are not necessarily aligned, or synchronized, with each other.

Role 2: Listen for new ranging sessions:
The RF parameters of a new ranging session might be known or not; the RF parameters may for example be determined in result of a monitoring of the RF parameters used in ongoing session with the aim to avoid collisions or use of similar authentication and encryption keys.
As the timing of a new session cannot be foreseen, the length of this Role 2 will be longer than Role 1, e.g. typically 100 ms.

Role 3: Stay idle, in particular to save power.

Role 4: Scan for ongoing sessions of other RF systems:
As will be described further below in this disclosure, this will help to determine what are the preferred RF parameters for new ranging sessions The assignment of the roles to the transceiver node devices may be switched regularly.

The invention requires additional control of the RF ranging system on the side of the car (or door/tollbooth for access control systems). For deciding how to assign the different roles to the different transceiver node devices, a controller device of the RF ranging system on the car side will have to consider the following information.

Figure 3:
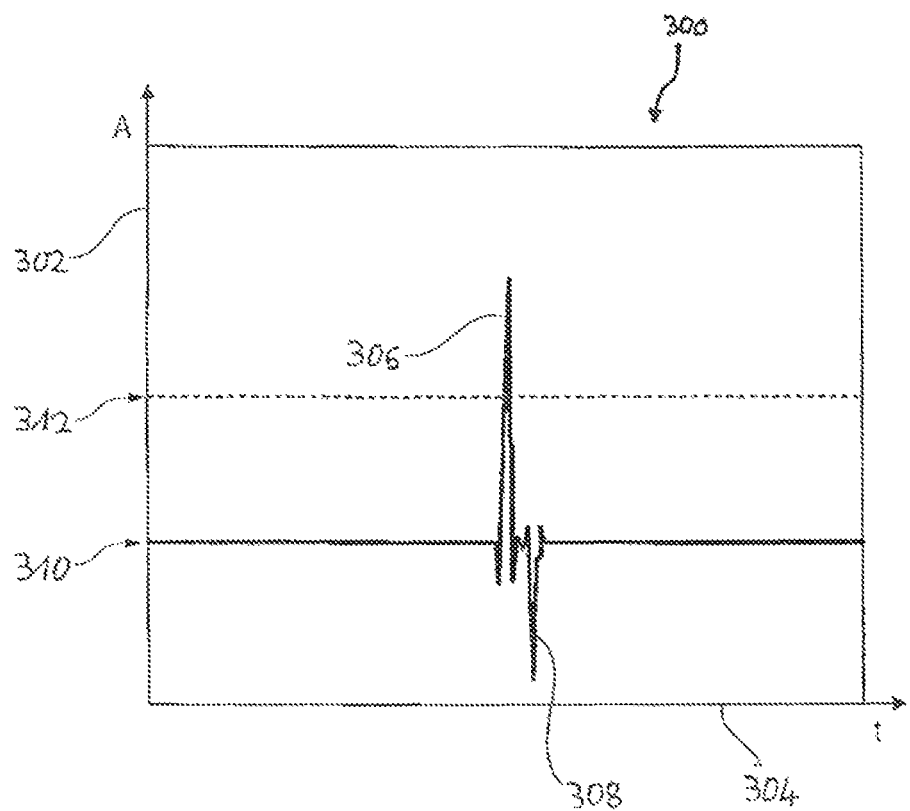
FIG. 3 shows a schematic diagram illustrating amplitudes of received signals as a function of time in a RF system according to an embodiment example of the invention.

In view of controlling the assignment of Role 1 to a transceiver node device, it is noted that ongoing ranging sessions have well known timing and high priority. Under this premise:
A quality measure of the signal, as illustrated in FIG. 3, can be used to assign only part of the transceiver node devices a specific session, e.g. in unobstructed environment, node devices on one same side of the car will probably receive an identical signal from a transmitter present on a median line according to the quality measure of the signal.

When a long range is determined for a key fob, some transceiver node devices might have the listening duty cycle decreased, because a rough determination of the key fob position is good enough for the system.

In view of controlling the assignment of Role 2 to a transceiver node device, it is noted that when listening and waiting for new ranging sessions, depending on the system implementation, the car might be aware or not that a new session will start soon, and of the RF parameters it will use in the new session.

In view of controlling the assignment of Role 3 to a transceiver node device, it is recognized that the duty cycle of the idle mode can be increased/decreased depending on:

State of the battery of the car

Time of the day: It can be assumed that a new ranging session is less likely to start at night time, e.g. at 2 am, than at day time, in particular e.g. at work end time of about 5 pm on a weekday. Artificial intelligence might be used to determine a pattern of usage of the role-controlled car and of cars in the environment that the role-controlled car enters, e.g. regularly.

If some of the transceiver node devices appear to have a same or near same RF view, then part of the node devices might have the duty cycle of their idle time (Role 3) increased.

In view of controlling the assignment of Role 4 to a transceiver node device, viz. the scanning of ongoing sessions of other RF systems, the following is recognized:

If a quiet RF neighbourhood is detected, the duty cycle of this listening (Role 4) can be decreased.

If a lot of activity is detected, then the duty cycle of this listening can be increased to ensure detection of ongoing sessions from other cars.

FIG. 1 illustrates a RF system 100 comprising a plurality of transceiver node devices 110, 112, 114, 116, 118, 120, a controller device 134, and a portable RF transceiver device, i.e. key fob 106, according to an embodiment example of the invention.

The RF system 100 is implemented as RF ranging system 102 installed in a car 104. Plural key fobs 106, one of which is shown in FIG. 1, are associated to, or in other words paired with the car 104 in that authentication keys are shared among the key fobs 106 and the car 104.

The car 104 comprises a body control unit (BCU) 132, as is known in the art, for controlling multiple systems and functions installed on the car 104.

The BCU 132 comprises a car-side remote link interface 138, which may be incorporated in a secured integrated circuit, such as a secure element (SE) or an embedded secure element (eSE), and which is configured to operate, i.e. establish, conduct and terminate, wireless link to the key fobs 106 located in a vicinity to the car. The wireless link between the body control unit 132 on the car 104 and the key fobs 106 is implemented as as any "out-of-band" channel (where "out-of-band" refers to being outside of RF bands that are occupied by RF ranging sessions), in particular as one or more of a RF link, a LE link, BLE (Bluetooth Low Energy) link, and a WiFi link. To this end, the key fob 106 comprises a key fob-side remote link interface 140 as a counterpart to the car-side remote link interface 138. The car 104, in particular the car-side remote link interface 138, may transmit via the wireless RF/LF/BLE link for example a beacon signal in order to poll or query for key fobs 106, and/or to initiate a ranging session with a key fob 106 located in a vicinity of the car 104. A key fob 106, which is located in the vicinity of the car 104, in particular by the key fob-side remote link interface 140, may respond and for example transmit a query-received-signal or data requested by the polling/querying signal via the wireless RF/LF/BLE link to the car-side remote link interface 138. Herein, the expression "vicinity of the car" is related to the transmission range of the wireless RF/LF/BLE link and refers to the area, within which wireless RF/LF/BLE signals sent by the car-side remote link interface 138 can be safely received by the key fob-side remote link interface 140, and vice versa. Carrier frequencies for BLE transmissions is approximately 2.5 GHz. Typical LE systems, viz. RSSI (Received Signal Strength Indicator)-based systems, may operate at approximately 22 kHz or at approximately 125 kHz, the latter being more common.

Typically, when implemented as an UWB RF ranging system 102, the RF system 100 (the RF ranging system 102) comprises, installed on the car 104, at least four, i.e. the first, second, third and fourth transceiver node devices 110, 112, 114 and 116 at each corner of the car 104, and a fifth transceiver node device 118 at the top of the car 104. One or more further transceiver node devices 120 may be installed, for example at exposed positions, on the car 104. Non-UWB RF systems typically comprise fewer node devices. For example, UHF systems may typically comprise one node device on the car 104. BLE (or WiFi) systems commonly comprise two node devices.

Each one of the transceiver node devices 110, 112, 114, 116, 118, 120 is capable to operate, i.e. establish, conduct and terminate, a RF connection, in particular an UWB (ultra-wide band) RF connection, to the key fobs 106 associated to (or paired with) the car. To this end, each one of the transceiver node devices 110, 112, 114, 116, 118, 120 has a node device-side RF antenna 126, and each one of the key fobs 106 associated to the car 104 has a key fob-side RF antenna 142. The RF antennas 126, 142 are capable to transmit and receive UWB RF signals to and from each other.

Ultra-wide band (UWB) refers to radio technology having a bandwidth exceeding the lesser of 500 MHz or 20% of the arithmetic center frequency, according to the definition given by the U.S. Federal Communications Commission (FCC). A Feb. 14, 2002 FCC Report and Order authorized the unlicensed use of UWB in the frequency range from 3.1 to 10.6 GHz.

Each one of the transceiver node devices 110, 112, 114, 116, 118, 120 is capable to assume each one of the plural roles 210, 220, 230, 240: a first role 210 comprising listening or answering to a message from an active communication session, in particular ranging sessions; a second role 220 comprising listening for new communication sessions, in particular ranging sessions; a third role 230 comprising staying idle, in particular to safe power, and a fourth role 240 comprising scanning for ongoing communication sessions, in particular ranging sessions, of other RF systems.

Figure 2:
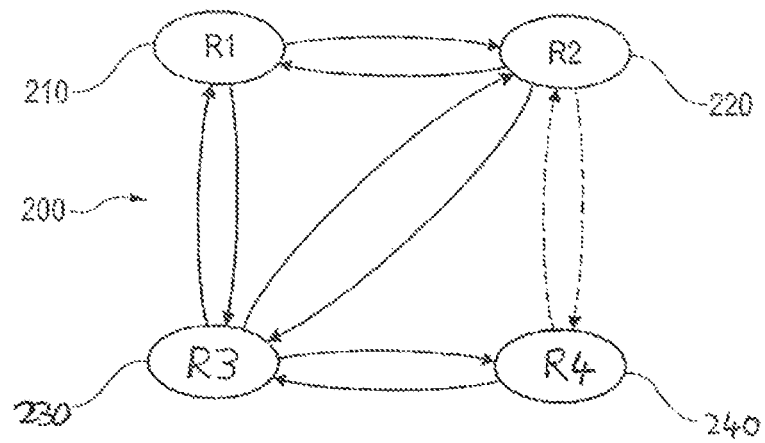
FIG. 2 shows a schematic diagram of a state machine comprising roles of the transceiver node devices in a RF system according to an embodiment example of the invention.

The first, second, third and fourth role 210, 220, 230, 240 as well as the intended switches or transitions between these roles are illustrated in FIG. 2.

FIG. 2 shows a schematic diagram of a state machine 200 comprising the roles 210, 220, 230, 240 of the transceiver node devices 110, 112, 114, 116, 118, 120 in a RF system 100 according to an embodiment example of the invention.

The switches or transitions between the roles are indicated in the state machine 200 shown in FIG. 2 by curved arrows. A switch or transition from any one of the roles 210, 220, 230, 240 of a transceiver node device to any another one of the roles of the same transceiver node device can be effected at a controllable point in time. A duration of performing any one of the roles can be effected for a controllable time period and/or for a controllable duty cycle. Control of a point in time of transitioning to and/or from, and/or a duration of performing, and/or a duty cycle of performing, any one of the first, second, third and fourth role 210, 220, 230, 240 for each one of the transceiver node devices 110, 112, 114, 116, 118, 120 is effected by the controller device 134.

To this end, each one of the transceiver node devices 110, 112, 114, 116, 118, 120 is communicatively interlinked with the controller device 134 via wired node link bus 122 and an EGE (Exterior Gateway ECU) 128, i.e. an ECU (Electronic Control Unit) that controls and facilitates an inter-bus connection to an in-vehicle network link 130, to which the BCU 132 is also connected. The in-vehicle network link 130 may be implemented as a CAN (Controller Area Network) bus or as an Ethernet connection, as is well known in the automotive industry. The wired node link bus 122 may be implemented for example as a CAN (Controller Area Network) bus, or as a LIN (Local Interconnect Network) bus, which are well known in the automotive industry. For enabling the connection to the node link bus 122, each one of the transceiver node devices 110, 112, 114, 116, 118, 120 and the control device 134 has its own link bus interface 124, which is connected by wire to the node link bus 122. A transceiver node devices 110, 112, 114, 116, 118, 120 may comprise multiple wireless transceivers, wherein each transceiver is provided for addressing a different radio standard.

At a controllable point in time, for example under control of the controller device 134, each one of the transceiver node devices 110, 112, 114, 116, 118, 120 is capable, to switch from the third role 230 (Idle state) to the first role 210, and back from the first role 210 to the third role 230. Likewise, each transceiver node device 110, 112, 114, 116, 118, 120 is capable to switch from the third role 230 to the second role 220, and back from the second role 220 to the third role 230. Further likewise, each transceiver node device 110, 112, 114, 116, 118, 120 is capable to switch from the third role 230 to the fourth role 240, and back from the fourth role 240 to the third role 230. The distinction between the second role 220 and the fourth role 240 may be optional. In particular, in practice the second role 220 and the fourth role 240 may a same device state.

A switch from the second role 220 directly to the fourth role 240 or a switch in the reverse direction directly from the fourth role 240 to the second role 220 will typically occur less often or is less likely, as one of the goals of the present invention is to save power, which favours transitions to the third role 230 (or idle mode). Therefore, such transitions are illustrated in the state machine 200 of FIG. 2 by dashed (broken) arrows. Though, direct transitions between the second role 220 and the fourth role 240 may occur in a role assignment schedule, in which a transceiver node device is controlled to "rotate" sequentially through all of the roles 210, 220, 230, 240. Again, the distinction between the second role 220 and the fourth role 240 may be optional.

To summarize the architecture of the RF system 100 shown in FIG. 1 in short, the controller device 134 is communicatively interlinked with each transceiver node device 110, 112, 114, 116, 118, 120, and is capable to control an assignment of roles 210, 220, 230 240 to each transceiver node device 110, 112, 114, 116, 118, 120. In particular the controller device 134 is capable to control for a transceiver node device 110, 112, 114, 116, 118, 120 a point in time to assume one of the roles 210, 220, 230, 240 and/or a duration of performing a role 210, 220, 230, 240 and/or a duty cycle of performing a role 210, 220, 230, 240.

The controller device 134 may be capable to switch an assignment of roles to each transceiver node device 110, 112, 114, 116, 118, 120 belonging to the RF system 100 regularly. Regularity may be effected by periodically switching, or by switching according to a predetermined time schedule.

For example, the controller device 134 may be capable to define for at least one, in particular for each, transceiver node device 110, 112, 114, 116, 118, 120 a pattern for the durations and/or duty cycles of the roles that the node device should perform. For example, the controller device 134 may define a pattern of duty cycles comprising:

1%±0.5% performing the first role 210,
24%±12% performing the second role 220,
50%±25% performing the third role 230, and
25%±13% performing the fourth role 240.

Herein, "%" refers to a time proportion of a duty cycle in relation to a total operation time of the RF system 100.

One embodiment of the regular switching of role assignments may be that the controller device 134 switches the roles of the transceiver node devices continuously, but in a synchronized manner, in an aim to optimize surveillance coverage and power consumption. For example, the controller device 134 may control the assignment of roles to the plural transceiver node devices 110, 112, 114, 116, 118, 120 for example in such a way that i) there is always at least one of the transceiver node devices listening for a new ranging sessions (i.e. performing the second role 220) on one side of the car 104, and ii) only one of the transceiver node devices is scanning RF space (i.e. performing the fourth role 240) at a time.

The switch to new configuration could be something which is decided either at node level or at controller level. For instance, if a node detects a new key fob starting a new ranging cycle, it will then synchronize on this one and then alert the controller. The controller will then update the other node devices so that they synchronize also on this new ranging cycle.

The controller device 134 may also be capable to switch an assignment of roles to each transceiver node device 110, 112, 114, 116, 118, 120 in response to triggering events. Such triggering evens may occur in the car 104, or outside of the car, and/or exterior of the RF system 100.

For example, triggering events for controlling a transceiver node device ID 110, 112, 114, 116, 118, 120 to assume the first role 210 comprise any one of the following: i) detection of a signal, which is outside of RF bands that are occupied by RF ranging sessions, in particular a Bluetooth Low Energy (BLE) signal or a WiFi signal, transmitted from a device belonging to the RF system 100 and querying to initiate a new communication session, in particular a ranging session, ii) detection of a low frequency signal sent from an apparatus, for example from the car 104, having the RF system 100, iii) detection of a geofencing barrier, and iv) detection of a motion of an object in an environment of the RF system 100.

The controller device 134 may be capable to perform at least one of the following:
1. synchronizing assignments of roles among at least two, in particular among all, transceiver node devices 110, 112, 114, 116, 118, 120, 2. setting up a configuration of RF parameters for at least one, in particular each, transceiver node device 110, 112, 114, 116, 118, 120 for each role 210, 220, 230, 240 of the node device,
3. receiving results of performing scanning for ongoing communication sessions from any transceiver node device 110, 112, 114, 116, 118, 120 performing the fourth role 240,
4. receiving ranging measurement data, in particular timestamps, when listening to messages during a ranging session of any transceiver node device 110, 112, 114, 116, 118, 120 of a RF ranging system 102 performing the first role 210.

Figure 4:
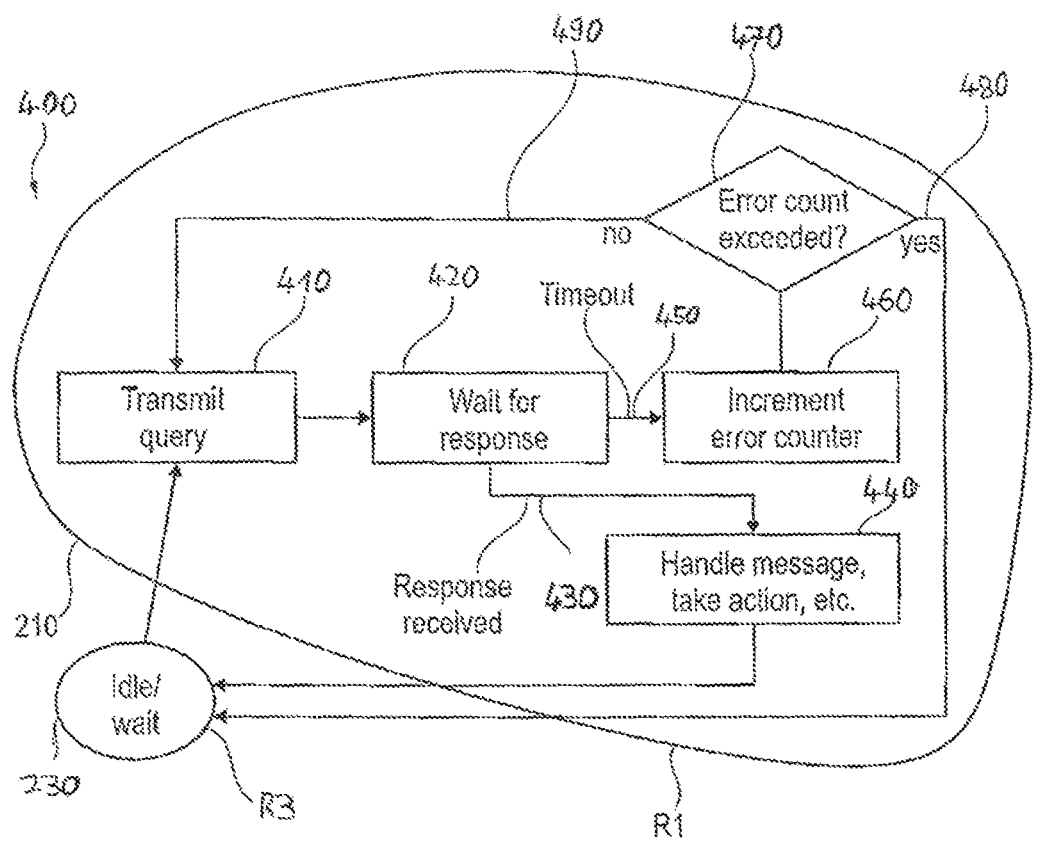
FIG. 4 shows a schematic diagram of a state machine implementing one of the roles of the transceiver node devices in a RF system according to an embodiment example of the invention.

Concerning the first role 210, the control device 134 may, for controlling a point in time of transitioning to and/or from the first role 210, and/or a duration of performing the first role 210, and/or a duty cycle of performing the first role 210, take into account at least the following information:

i) A quality of a received signal, refer for example to FIG. 4. If a signal quality is "good", this may result in controlling the RF ranging system 102 such that a specific communication session is assigned to only a part of the transceiver node devices 110, 112, 114, 116, 118, 120.
ii) A relationship between qualities of signals as received by at least two transceiver node devices 110, 112, 114, 116, 118, 120.
iii) Qualities of interfering signals as received by at least two transceiver node devices 110, 112, 114, 116, 118, 120.
iv) Information relating to collisions between own messages of the RF system 100 and interfering messages from other RF systems.
v) A distance 108 to a RF transceiver device 106 operating at the other end of an active RF communication session. If for example a RF transceiver device or key fob 106 is located at a large distance 108 to the RF ranging system 102, in particular located further away than a predetermined distance, from the RF ranging system 102, this may result in controlling at least one of the transceiver node devices 110, 112, 114, 116, 118, 120 to have a duration and/or a duty cycle of the first role 210 decreased, because a rough determination of the distance 108 to a key fob 106 that is "far away" may be sufficient for the RF ranging system 102 for the purpose of controlling access to the car 104.

In view of controlling the assignment of Role 1 to a transceiver node device, it is noted that ongoing ranging sessions have well known timing and high priority. Under this premise, a quality measure of the signal, as illustrated in FIG. 3, can be used to assign only part of the transceiver node devices a specific session. A concept of evaluating signal quality shall be explained below with reference to FIG. 3.

For example, if it is judged on the basis of the quality of a received signal that there is an unobstructed environment between the key fob 106 and the car 104, transceiver node devices (e.g. node devices 110 and 112 in FIG. 1) arranged on one same side of the car (e.g. the left side of the car 104 in FIG. 1) will probably receive an identical signal from a RF transmitter (e.g. key fob 106 in FIG. 1) present on a median line (for an explanation of this expression, see below) according to the quality measure and time of flight of the signal.

FIG. 3 shows a schematic diagram 300 illustrating schematically amplitudes A of received signals as a function of time t in a RF system 100, in particular a RF system based on ultra-wide band (UWB) technology, according to an embodiment example of the invention. Amplitudes A of received signals are measured along the amplitude axis 302 (i.e. the vertical axis in FIG. 3), and the evolving time t is measured along the time axis 304 (i.e. the horizontal axis in FIG. 3). In the diagram 300, there is shown the course of a first signal 306, which represents the amplitude of a transmitted signal as measured at a receiver for the transmitted signal. Also shown in FIG. 3 is the course of a second signal 308, which represents the amplitude of a returned signal as measured at the transmitter of the signal. The first signal 306 and the second signal 308 are drawn in FIG. 3 with respect to a common signal amplitude baseline 310. Still furthermore in the diagram 300, there is shown a predetermined signal amplitude threshold 312, relative to which a quality of a detected signal can be determined.

In the example illustrated in FIG. 3, if a transceiver node device (e.g. node device 110 in FIG. 1) on the car 104 transmits an ultra-wide band RF pulse signal to query for key fobs 106 which might be present within an emission range of the transmitted RF pulse signal, then the signal line 306 may represent the amplitude of the transmitted signal as received by a key fob that is present within the emission range of the transmitted signal (e.g. key fob 106 in FIG. 1), and the signal line 308 may represent the amplitude of the returned signal as received by the transceiver node device 110 after retransmission by the key fob 106 of the signal 306 received by the key fob 106.

Further in the example illustrated in the diagram 300 of FIG. 3, if the peak of the first signal 306 exceeds well above the predetermined amplitude threshold 312, then the quality of the signal 306 may be determined to be "good". If the (positive) height of the peak of the first signal 306 (received at the key fob 106 after the transmitted signal has travelled the distance 108 one time) is quite strong as compared to the (negative) height of the peak of the second signal 308 (received at the node device 110 after the transmitted signal has travelled the distance 108 two times), then the environment (including the area between the key fob 106 and the node device 110) may be determined to be unobstructed. If the key fob 106 is carried by a user for example in his back pocket, i.e. on the backside of the user's body as seen from the node device 110 on the car 104, then the amplitudes of reflected signals will be stronger because of the attenuation due to the user's body.

Further in the example illustrated in the diagram 300 of FIG. 3, if in ongoing RF ranging sessions (i.e. by at least one transceiver node device performing the first role), it is detected that one or more key fobs are present only on one side of the car, e.g. in FIG. 1, the key fob 106 being on the left side of the car 104, the controller device 134 could decide that the transceiver node devices 114 and 116 located on the other side (e.g. in FIG. 1 the right side) of the car 104 do not listen (i.e. perform the first role 210) for these ongoing RF ranging sessions, and the according role assignment could be continued unless or until for example a user movements toward this side is detected or an approaching of another key fob is detected.

The expression "median line" mentioned above in the example of results of signal quality judgement refers to a case where transceiver node devices arranged on one same side of the car (e.g. In FIG. 1, the node devices 110 and 112 arranged at the left side of the car 104) detect similar strengths and similar times of flight of the received signals, it may be determined that the key fob is equidistant to both node devices 110, 112. In result of such determination, it may be decided by the controller device 134 that there is no need for the two node devices 110 and 112 to participate in the same ranging session (i.e. to perform the first role 210) in relation to the one key fob 106. The controller device 134 may also be programmed according to the assumption that it is more likely the key fob will move (or be moved by a moving user) towards the driver door of the car than towards any other of the doors of the car.

As stated already above, ultra-wide band (UWB) refers to radio technology having a bandwidth exceeding the lesser of 500 MHz or 20% of the arithmetic center frequency. The carrier frequencies of UWB may range from 3.1 to 10.6 GHz. UWB pulses as shown in FIG. 3 as part of the first and second signals 406 and 408 are typically only 2 ns wide; this renders UWB ranging highly immune to multipath reflections, because other reflected signals are unlikely to affect each other due to their narrow pulse widths. A ranging session will typically last 100 ms. Accordingly, the idle mode (third role 230) will typically last a fraction or multiples of this value (i.e. 100 ms). A ranging cycle will typically occur at 10 Hz or less. Accordingly, a switching of roles will typically occur at multiples of 10 ms.

With such timing, the embodiment example mentioned above, according to which the controller device 134 defines a pattern of duty cycles comprising:
  1%±0.5% performing the first role 210,
  24%±12% performing the second role 220,
  50%±25% performing the third role 230, and
  25%±13% performing the fourth role 240,
wherein "%" refers to a time proportion of a duty cycle in relation to a total operation time of the RF system 100, may also be expressed in terms of patterns that are measured in time durations, wherein "%" is replaced by "ms".

Hence, the controller device 134 may define patterns of duty cycles comprising:
  1 ms±0.5 ms performing the first role 210,
  24 ms±12 ms performing the second role 220,
  50 ms±25 ms performing the third role 230,
  25 ms±13 ms performing the fourth role 240,
or multiples of these durations.

Concerning the second role 220, the controller device 134 may, for controlling a point in time of transitioning to and/or from the second role 220, and/or a duration of performing the second role 220, and/or a duty cycle of performing the second role 220, take into account the following information: one or more synchronization patterns of RF communication sessions, which are ongoing in an environment and which have been detected in particular by a transceiver node device 110, 112, 114, 116, 118, 120 during performing the third role 230. On the basis of detected synchronization patterns and RF parameters of ongoing RF communication sessions, for example RF parameters to be used in a new communication session expected to start soon may be determined, in particular in such a way that a synchronization pattern and other RF parameters of the new communication session are selected, which are not used in the ongoing communication session. Furthermore, the controller device 134 may also take into consideration previous radio packet collision events, i.e. detecting failures to transmit/receive data packets without actively scanning the band outside of normal transmit/receive operations.

Concerning the fourth role 240, the controller device 134 may, for controlling a point in time of transitioning to and/or from the fourth role 240, and/or a duration of performing the fourth role 240, and/or a duty cycle of performing the fourth role 240, take into account the following information: an amount of RF activity present and/or detected by the RF system 100 in an environment of the RF system 100. This may result in particular in decreasing a duration and/or a duty cycle for a transceiver node device 110, 112, 114, 116, 118, 120 to perform the fourth role 240, if a low or absent amount of RF activity is present and/or detected. On the contrary, if a large amount of RF activity is present and/or detected, this may result in increasing a duration and/or a duty cycle for a transceiver node device 110, 112, 114, 116, 118, 120 to perform the fourth role 240.

For example, if RF communication sessions of other RF systems are detected in the vicinity of the present RF system 100, then the synchronization patterns and RF parameters of these sessions may be determined and then used to steer synchronization patterns and RF parameters of a new communication session of the present RF system 100, which may be expected or scheduled to start soon. Such steering can be controlled in particular in such a way that a synchronization pattern and other RF parameters of the new communication session are selected, which are not used in the detected communication sessions of the other RF systems. Again, also in this context, previous radio packet collision events may be taken into consideration, i.e. detecting failures to transmit/receive data packets without actively scanning the band outside of normal transmit/receive operations.

Concerning the third role 230, the control device 134 may, for controlling a point in time of transitioning to and/or from the third role 230, and/or a duration of performing the third role 230, and/or a duty cycle of performing the third role 230, take into account the following information:
1. a state of a battery used to supply power to the RF system, in particular a battery of an apparatus, for example the car 104, having the RF system 100. This may result, for example, in increasing or decreasing a duration and/or a duty cycle of the third role 230 as a function of a charging state of the battery.
2. a time of the day. This may result, for example, in increasing or decreasing a duration and/or a duty cycle of the third role 230 as a function of a predetermined average amount of social activity and/or RF activity at a time of the day. In particular a duration and/or a duty cycle of the third role 230 may be increased at night time.
3. a relationship between amounts of RF activity as received by at least two transceiver node devices 110, 112, 114, 116, 118, 120. This may result, for example, in increasing or decreasing a duration and/or a duty cycle of the third role 230 for a part of the at least two transceiver node devices 110, 112, 114, 116, 118, 120. For example, if the at least two node devices have a same, or almost same, or similar RF view, then a part of them may be controlled to have their duration and/or duty time of the idle state (third role 230) increased.

The controller device 134 can be implemented, for example, as a part of the body control unit 132. Alternatively, the controller device 134 can be implemented as a separate unit, which is communicatively coupled directly or indirectly to the node link bus 122. For example, the controller device 134 may be communicatively directly coupled to the exterior gateway ECU 128 in FIG. 1 and thereby be indirectly coupled to the node link bus 122.

At least a portion of the control of the assignment of roles to the transceiver node devices may not be implemented in a central controller device 134. Rather, at least a portion of the control of the assignment of roles to the transceiver node devices 110, 112, 114, 116, 118, 120 may be implemented at the level of the node devices.

A switch to new role assignment could be something, which is decided either at node device level or at controller device level. For example, if one of the transceiver node devices 110, 112, 114, 116, 118, 120 detects a new key fob 106 starting a new RF ranging session, this node device will then synchronize on this new ranging session and thereafter alert the controller device 134. The controller device 134 may then update the other transceiver node devices such that they also synchronize on this new ranging session.

FIG. 4 shows a schematic diagram of a state machine 400 implementing the first role 210 of the transceiver node devices 110, 112, 114, 116, 118, 120 in a RF system 100 according to an embodiment example of the invention.

In a transceiver node device 110, 112, 114, 116, 118, 120, in an embodiment example, the first role 210 may be implemented, as illustrated in FIG. 4, so to comprise the following steps: The node device is effected to transition from the idle state/third role 230, and transmits, at 410, a query for receiving a response from another device belonging to the RF system 100. Thereafter, at 420, the node device waits for a response. As indicated at 430, if a response comprising a message is received, at 440, the node device handles the message and/or takes action according to a contents of the message. Otherwise, if no response is received until an occurrence of a timeout, as indicated at 450, the node device effects incrementing an error counter at 460. Further to having incremented the error counter at 460, in the RF system 100, it is checked, at 470, if a predetermined error count maximum is exceeded. If the error count maximum is exceeded, as indicated by a "yes" at 480, the node device transitions to the third role 230. Otherwise, if the error count maximum is not exceeded, as indicated by a "no" at 490, the node device returns to 410 and transmits a further query for a response from another device belonging to the RF system 100.

Supplementary, it is to be noted that "having" or "comprising" does not exclude other elements or steps, and that "a" or "an" does not exclude a plurality. In addition, it is to be noted that features or steps, which have been described above with reference to one of the above embodiment examples, may also be used in combination with other features or steps of other embodiment examples that have been described above. Reference numerals in the claims are not to be construed as limitations.

LIST OF REFERENCE NUMERALS

100 RF system
102 RF ranging system
104 car
106 key fob
108 distance
110 first transceiver node device
112 second transceiver node device
114 third transceiver node device
116 fourth transceiver node device
118 fifth transceiver node device
120 further transceiver node device
122 node link bus
124 link bus interface
126 RF antenna (node device)
128 exterior gateway ECU (EGE)
130 network link
132 body control unit
134 controller device
136 network link interface
138 car-side remote link interface
140 key fob-side remote link interface
142 RF antenna (key fob)
144 command button (key fob)
200 state machine of roles
210 first role, R1
220 second role, R2
230 third role, R3
240 fourth role, R4
300 amplitude-vs-time diagram
302 amplitude axis
304 time axis
306 transmitted signal at receiver (first signal)
308 returned signal at transmitter (second signal)
310 amplitude baseline
312 amplitude threshold
400 state machine of first role
410 transmit query
420 wait for response
430 response received
440 handle message, take action, etc.
450 timeout
460 increment error counter
470 error count exceeded ?
480 yes
490 no

The invention claimed is:

1. An RF system for controlling secure keyless access, the RF system having at least one transceiver node device and a controller device, wherein:
   the transceiver node device is configured to assume, at a controllable point in time and/or for a controllable time period, each one of the following roles:
   a first role comprising listening or answering to a message from an active communication session including RF ranging sessions,
   a second role comprising listening for new communication sessions, and
   a third role comprising staying idle;
   the controller device is configured to control the role of the transceiver node device; and
   a remote link interface of the controller device is configured to wirelessly communicate with an an other remote link interface, using an out-of-band channel being outside of RF bands occupied by the RF ranging sessions, to determine the role of the transceiver node device.

2. The RF system according to claim 1, wherein the at least one transceiver node device is configured, at a controllable point in time, to switch from the third role to the first role and from the first role to the third role, and to switch from the third role to the second role and from the second role to the third role.

3. The RF system according to claim 1,
   wherein the at least one transceiver node device is configured to further assume, at a controllable point in time and/or for a controllable time period, a fourth role comprising scanning for ongoing communication sessions of other RF systems,
   and wherein the at least one transceiver node device is configured, at a controllable point in time, to switch from the third role to the fourth role and from the fourth role to the third role.

4. The RF system according claim 3, further having one or more other transceiver node devices, wherein each transceiver node device is configured to assume each one of the first, second, third and fourth roles for a controllable time period under control of the controller device.

5. The RF system according to claim 1, wherein for controlling a point in time of transitioning to and/or from, and/or a duration of performing, and/or a duty cycle of performing, the first role, the following information is taken into account by the controller device of the RF system:
- a quality of a received signal for assigning a specific communication session to only a part of the transceiver node devices,
- a relationship between qualities of signals as received by at least two transceiver node devices,
- qualities of interfering signals as received by at least two transceiver node devices,
- information relating to collisions between own messages of the RF system and interfering messages from other RF systems, and
- a distance to a RF transceiver device operating at the other end of an active RF communication session for decreasing a duration and/or a duty cycle of the first role of a transceiver node device located at a large distance located further away than a predetermined distance, from the RF transceiver device operating at the other end.

6. The RF system according to claim 1, wherein for controlling a point in time of transitioning to and/or from, and/or a duration of performing, and/or a duty cycle of performing, the second role, the following information is taken into account by the controller device of the RF system:
- one or more synchronization patterns of RF communication sessions, which are ongoing in an environment and which have been detected by a transceiver node device during performing the fourth role for determining RF parameters to be used in a new communication session expected to start, and
- one or more previous radio packet collision events detecting failures to transmit/receive data packets without actively scanning a band outside of a normal transmit/receive operation.

7. The RF system according to claim 1, wherein for controlling a point in time of transitioning to and/or from, and/or a duration of performing, and/or a duty cycle of performing, the third role, the following information is taken into account by the controller device of the RF system:
- a state of a battery used to supply power to the RF system having the RF system to increase or decrease a duration and/or a duty cycle of the third role as a function of a charging state of the battery,
- a time of the day to increase or decrease a duration and/or a duty cycle of the third role as a function of a predetermined average amount of social activity and/or RF activity at a time of the day to increase a duration and/or a duty cycle of the third role at night time, and
- a relationship between amounts of RF activity as received by at least two transceiver node devices to increase or decrease a duration and/or a duty cycle of the third role for a part of the at least two transceiver node devices.

8. The RF system according to claim 1, wherein for controlling a point in time of transitioning to and/or from, and/or a duration of performing, and/or a duty cycle of performing, the fourth role, the following information is taken into account by the controller device of the RF system:
- an amount of RF activity present and/or detected by the RF system in an environment of the RF system for decreasing a duration and/or a duty cycle for a transceiver node device to perform the fourth role, if a low or absent amount of RF activity is present and/or detected, or for increasing a duration and/or a duty cycle for a transceiver node device to perform the fourth role, if a large amount of RF activity is present and/or detected.

9. The RF system according to claim 1, wherein triggering events for controlling a transceiver node device to assume the first role comprise any one of the following:
- detection of a signal, which is outside of the RF bands that are occupied by the RF ranging sessions, transmitted from the remote link interface of the controller device and querying to initiate a new communication session,
- detection of a low frequency signal sent from an apparatus having the RF system,
- detection of a geofencing barrier, and
- detection of a motion of an object in an environment of the RF system.

10. The RF system according to claim 1, wherein the transceiver node device being configured to perform the first role comprises the transceiver node device being configured:
- to transmit a query for a response from another device belonging to the RF system,
- to wait for a response,
- if a response comprising a message is received, to handle the message and/or taking action according to contents of the message, and
- if no response is received until an occurrence of a timeout, to increment an error counter.

11. The RF system according to claim 10, wherein the transceiver node device being configured to perform the first role further comprises the transceiver node device being configured:
- further to having incremented the error counter, to check if a predetermined error count maximum is exceeded,
- if the error count maximum is exceeded, to transition to the third role, and
- if the error count maximum is not exceeded, to transmit a further query for a response from another device belonging to the RF system.

12. The RF system according to claim 1, wherein the controller device is configured to switch an assignment of roles to the at least one transceiver node device belonging to the RF system, regularly and periodically or according to a predetermined time schedule.

13. The RF system according to claim 1, wherein the controller device is configured to perform at least one of:
- synchronizing assignments of roles among at least two transceiver node devices,
- defining for at least one transceiver node device a pattern for the durations and/or duty cycles of the roles that the node device should perform defining a pattern of duty cycles comprising 1% ±0,5% performing the first role, 24% ±12% performing the second role, 50% ±25% performing the third role, and 25% ±13% performing the fourth role, wherein "%" refers to a time proportion of a duty cycle in relation to total operation time,
- setting up a configuration of RF parameters for at least one transceiver node device of the node device,
- receiving results of performing scanning for ongoing communication sessions from any transceiver node device performing the fourth role, and
- receiving ranging measurement data, including timestamps, when listening to messages during a ranging session of any transceiver node device performing the first role.

14. The RF system of claim 1, wherein:
the RF system controls secure keyless car access; and
the remote link interface of the controller device is a car-side remote link interface.

15. The RF system of claim 14, wherein the other remote link interface is a key fob-side remote link interface of a key fob.

16. A method for operating an RF system for controlling secure keyless access, wherein the RF system has a plurality of transceiver node devices and a controller device communicatively interlinked with each one of the transceiver node devices, wherein the method comprises at least one of following sequences 1) to 5) of operation:

Sequence 1) assuming, by at least one of the transceiver node devices, for respective time periods controlled by the controller device based on wireless communications, using an out-of-band channel being outside of RF bands occupied by RF ranging sessions of the at least one transceiver node device, between a remote link interface of the controller device and an other remote link interface, each one of the following roles:
  a first role comprising listening or answering to a message from an active communication session including ranging sessions, wherein the first role includes detecting signals that are outside of RF bands being used by the ranging sessions,
  a second role comprising listening for new communication sessions,
  a third role comprising staying idle, and
  optionally, a fourth role comprising scanning for ongoing communication sessions of other RF systems;

Sequence 2) at least one transceiver node device, under control of the controller device based on wireless communications, using an out-of-band channel being outside of RF bands occupied by RF ranging sessions of the at least one transceiver node device, between a remote link interface of the controller device and an other remote link interface:
  switching from the third role to the first role and from the first role to the third role, switching from the third role to the second role and from the second role to the third role, and
  switching from the third role to the fourth role and from the fourth role to the third role;

Sequence 3) for controlling based on wireless communications, using an out-of-band channel being outside of RF bands occupied by RF ranging sessions of the at least one transceiver node device, between a remote link interface of the controller device and an other remote link interface, in a transceiver node device, a point in time of transitioning to and/or from, and/or a duration of performing, and/or a duty cycle of performing, 3.1) the first role, the controller device taking into account at least one of the following information:
  a quality of a received signal for assigning a specific communication session to only a part of the transceiver node devices,
  a relationship between qualities of signals as received by at least two transceiver node devices, and
  a distance to a RF transceiver device operating at the other end of an active RF communication session for decreasing a duration and/or a duty cycle of the first role of a transceiver node device located at a large distance located further away than a predetermined distance, from the RF transceiver device operating at the other end;

3.2) the second role, the controller device taking into account the following information:
  one or more synchronization patterns of RF communication sessions, which are ongoing in an environment and which have been detected by a transceiver node device during performing the fourth role for determining RF parameters to be used in a new communication session expected to start;

3.3) the third role, the controller device taking into account at least one of the following information:
  a state of a battery used to supply power to the RF system having the RF system to increase or decrease a duration and/or a duty cycle of the third role as a function of a charging state of the battery,
  a time of the day to increase or decrease a duration and/or a duty cycle of the third role as a function of a predetermined average amount of social activity and/or RF activity at a time of the day to increase a duration and/or a duty cycle of the third role at night time, and
  a relationship between amounts of RF activity as received by at least two transceiver node devices to increase a duration and/or a duty cycle of the third role for a part of the at least two transceiver node devices;

3.4) the fourth role, the controller device taking into account the following information:
  an amount of RF activity present and/or detected by the RF system in an environment of the RF system for decreasing a duration and/or a duty cycle for a transceiver node device to perform the fourth role, if a low or absent amount of RF activity is present and/or detected, or for increasing a duration and/or a duty cycle for a transceiver node device to perform the fourth role, if a large amount of RF activity is present and/or detected;

Sequence 4) the controller device switching an assignment of roles to the at least one transceiver node device belonging to the RF system, regularly and periodically or according to a predetermined time schedule;

Sequence 5) the controller device performing at least one of the following:
  5.1) synchronizing assignments of roles among at least two transceiver node devices,
  5.2) defining for at least one transceiver node device a pattern for the durations and/or duty cycles of the roles that the node device should perform defining a pattern of duty cycles comprising 1% ±0,5% performing the first role, 24% ±12% performing the second role, 50% ±25% performing the third role, and 25% ±13% performing the fourth role, wherein "%" refers to a time proportion of a duty cycle in relation to total operation time,
  5.3) setting up a configuration of RF parameters for at least one transceiver node device for each role of the node device,
  5.4) receiving results of performing scanning for ongoing communication sessions from any transceiver node device performing the third role, and
  5.5) receiving ranging measurement data, including timestamps, when listening to messages during a ranging session of any transceiver node device performing the first role.

17. The method of claim 16, wherein:
the RF system controls secure keyless car access; and
the remote link interface of the controller device is a car-side remote link interface.

18. The method of claim 17, wherein the other remote link interface is a key fob-side remote link interface of a key fob.

19. A non-transitory machine-readable storage medium storing a software program, for controlling or executing the method according to claim 16, when run on a data processing system or a processor or a micro-processor or a control device or an electronic control unit (ECU) or a body control unit (BCU) or a computer.

\* \* \* \* \*